(12) United States Patent
Uchida et al.

(10) Patent No.: US 6,662,345 B2
(45) Date of Patent: Dec. 9, 2003

(54) METHOD AND APPARATUS FOR DESIGNING PRINTED-CIRCUIT BOARD

(75) Inventors: Hiroki Uchida, Kawasaki (JP); Yasuo Yamagishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/155,115

(22) Filed: May 28, 2002

(65) Prior Publication Data

US 2002/0144228 A1 Oct. 3, 2002

Related U.S. Application Data

(63) Continuation of application No. PCT/JP00/00006, filed on Jan. 4, 2000.

(51) Int. Cl.$^7$ .............................................. G06F 17/50
(52) U.S. Cl. ............................................. 716/1; 716/4
(58) Field of Search ........................................... 716/1.4

(56) References Cited

U.S. PATENT DOCUMENTS

| 4,298,348 A | * | 11/1981 | Ivory ............................ 436/7 |
| 5,550,750 A | * | 8/1996 | Wolff .......................... 716/10 |
| 5,644,687 A | * | 7/1997 | Agonafer et al. ........... 345/419 |
| 6,389,582 B1 | * | 5/2002 | Valainis et al. ................ 716/9 |

FOREIGN PATENT DOCUMENTS

| EP | 0 892 331 A2 | 1/1999 |
| JP | 4-036872 | 2/1992 |
| JP | 5-274391 | 10/1993 |
| JP | 6-077639 | 3/1994 |
| JP | 6-290234 | 10/1994 |
| JP | 6-301746 | 10/1994 |
| JP | 10-002801 | 1/1998 |
| JP | 11-201647 | 7/1999 |

OTHER PUBLICATIONS

Form PCT/IB/338, Notification of Transmittal of copies of translation of the International Preliminary Examination Report (English).
Form PCT/IPEA/409, International Preliminary Examination Report (English translation) for PCT/JP00/00006.

* cited by examiner

Primary Examiner—Matthew Smith
Assistant Examiner—Andrea Liu
(74) Attorney, Agent, or Firm—Staas & Halsey LLP

(57) ABSTRACT

A thermal analysis in heating a print-circuit board in a reflowing furnace is simulated by a processor using data required for the design and thermal analysis of the printed-circuit board that carries solder-bonded components. The result of simulation indicates the possibility of existence of unmelted solder bonds heated at peak temperature below a predetermined lower limit and solder bonds heated at temperature above a predetermined upper limit. On the basis of the result, the components that are likely to be heated at inapplicable temperature are redesigned so that they can actually be heated at temperature in the predetermined range. The modification of design is displayed.

8 Claims, 8 Drawing Sheets

DISTANCE FROM THE CENTER OF COMPONENT A

FIG. 6

|  | HEAT CAPACITY PER UNIT PROJECTION AREA OF COMPONENT ON BOARD |
|---|---|
| COMPONENT A1 | 4.2 |
| COMPONENT A2 | 3.7 |
| COMPONENT A3 | 3.5 |
| COMPONENT A4 | 2.9 |
| COMPONENT A5 | 2.4 |

HEAT CAPACITY · LARGE ↑

HEAT CAPACITY · SMALL ↓

TEMPERATURE (°C)

TEMPERATURE (°C)

METHOD AND APPARATUS FOR DESIGNING PRINTED-CIRCUIT BOARD

This application is a continuing application, filed under 35 U.S.C. §111(a), of International Application PCT/JP00/00006, filed Jan. 4, 2000.

TECHNICAL FIELD

The present invention is related to a method and an apparatus for designing a printed-circuit board, more particularly, to a method and an apparatus for designing a printed-circuit board in consideration of a temperature distribution in reflowing.

BACKGROUND ART

In design of printed-circuit boards (also referred to as printed boards or simply as boards), importance is put on functions and computing performance in operation, and electronic components (referred to simply as components hereinafter) are mounted in high density. Also, in order to ensure the performance after printed-circuit boards are completed, are carried out transmission line analysis for evaluating delay, reflection, cross-talk noise and the like of electric signals caused by wiring patterns and thermal analysis for evaluating thermal problems of the printed-circuit boards caused by heat generation by mounted components. The results of these analyses are considered for designing the printed-circuit boards.

Of these analyses, are known, as techniques of reflecting the results of thermal analysis of printed-circuit boards for arrangement of the components, a component arrangement system in which components are arranged on a printed-circuit board in consideration of heat generation conditions and heat resistance conditions of the individual components, as disclosed by Japanese Unexamined Patent Publication No. HEI 5(1993)-274391; an interactive arrangement system in which components are interactively arranged in consideration of heating values per region of a printed-circuit board as disclosed by Japanese Unexamined Patent Publication No. HEI 6(1994)-290234; and an automatic component arrangement device in which components are arranged in consideration of cooling of heat-generating components as disclosed by Japanese Unexamined Patent Publication No. HEI 6(1994)-301746.

However, these designing methods of printed-circuit boards are all intended to prevent components from being damaged by heat generated when the circuits on the printed-circuit boards operates, but no account is taken of problems during production steps when the components are placed and mounted on the boards.

In current manufacture of printed-circuit boards, surface mounting is a mainstream, and components are mounted (soldered) onto a board in a heating furnace referred to as a reflow furnace. At this time, on the printed-circuit board, some regions are easily heated and some regions are not easily heated because of difference in heat capacity. If components having large thermal capacities are densely mounted on the printed-circuit board, the temperature of joints to be soldered around these components is not easily raised in a reflow-soldering process. If these joints are heated sufficiently, the temperature of components with small thermal capacities are overheated and thermally damaged. Attempts have been made to solve these problems by adjusting heating conditions in a reflow furnace in production process, but the problems are not solved basically. These thermal problems in the production process of printed-circuit boards not only cause difficulty in manufacture of the printed-circuit boards but also are problems directly connected to the reliability of the manufactured printed-circuit boards.

Further, in recent years, from the viewpoint of the protection of the environment, lead-free solders are tried and attention is paid to a lead-free solder of an amalgam of silver and tin which is highly reliable. The solder of an amalgam of silver and tin has a higher melting point of about 210° C. than a tin-lead solder (having a melting point 183° C.). Accordingly, it becomes more important to heat the printed-circuit boards uniformly at reflowing.

However, in conventional designing of the printed-circuit boards, importance is attached only to their performance after their completion, and consideration is hardly given to uniform heating of the printed-circuit boards at reflow-heating.

In view of these respects, the present invention is to provide a method and an apparatus for designing a printed-circuit board which allow for uniform heating of the printed-circuit board at reflow soldering.

DISCLOSURE OF INVENTION

The present invention provides a method for designing a printed-circuit board comprising the steps of: inputting beforehand data necessary for designing and thermally analyzing a printed-circuit board on which a component having a solder joint is mounted; thermally analyzing the printed-circuit board by simulating the heating of the printed-circuit board in a reflow furnace with use of the input data necessary for the thermal analysis; evaluating from a result of the thermal analysis whether or not there exists at least either one of an unmelted solder joint whose peak temperature does not reach a predetermined lower limit temperature at heating and an over-heated component whose temperature exceeds a predetermined upper limit temperature at heating; according to a result of the above evaluation, changing a design of a component having the unmelted solder joint and/or the over-heated component so that the temperature of the unmelted solder joint and/or the over-heated component is within a range from the lower limit temperature to the upper limit temperature; and outputting the result of change of the design.

According to the present invention, in the designing of a printed-circuit board, consideration is given to the uniform heating of the printed-circuit board at reflow-heating. Thus, it is possible to produce a reliable printed-circuit board having stably soldered joints which is free of damaged components.

BRIEF DESCRIPTION OF DRAWINGS

FIG. 6 shows the contents of a table in which components having the same function are listed in order of heat capacity, the table being stored in a component library in a memory in an embodiment;

BEST MODE FOR CARRYING OUT THE INVENTION

Figure 1:
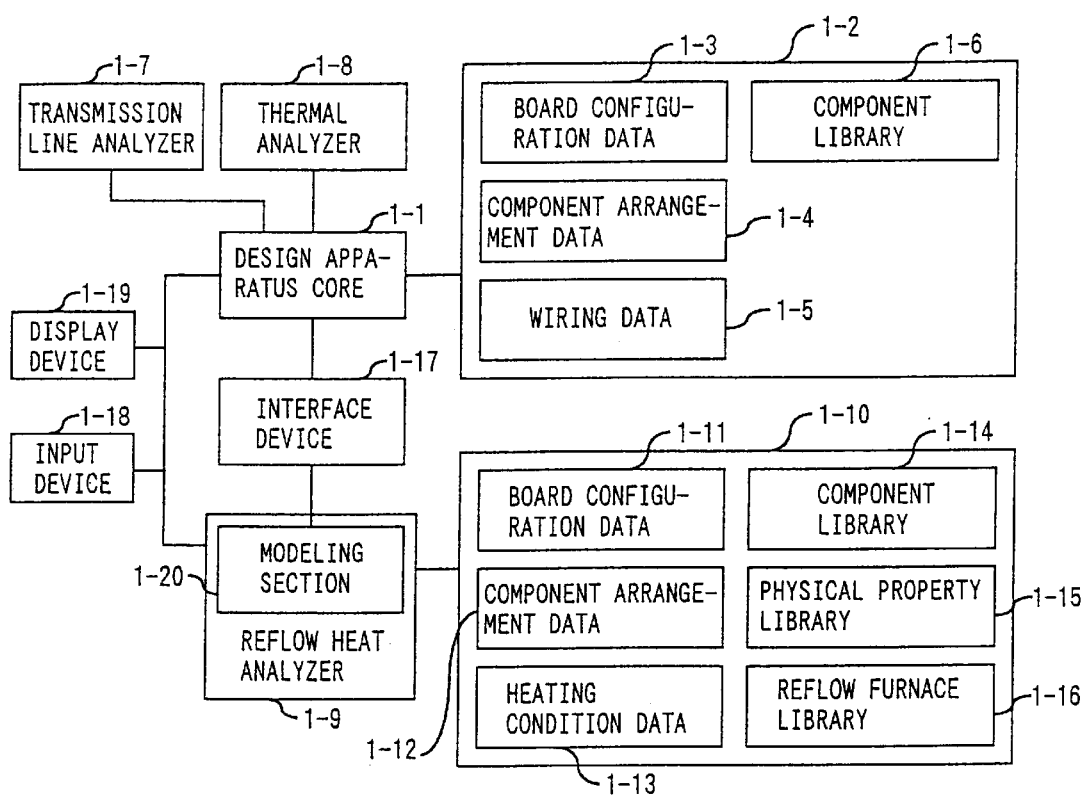
FIG. 1 is a block diagram illustrating the construction of an embodiment of an apparatus for designing a printed-circuit board in accordance with the present invention.

In the present invention, the data necessary for designing and thermally analyzing mean both data necessary for design and data necessary for thermal analysis. The data necessary for design, for example, include data on the shape and dimensions of printed-circuit boards, data on the type and shape of components, data on the positions of components and data on wiring patterns for the printed-circuit boards. The data necessary for thermal analysis, for example, if the thermal analysis is conducted by modeling a printed-circuit board and components for their thermal analysis, include data on the shape and dimensions of a printed-circuit board, data on the type and shape of components, data on the positions of components, data on heating conditions such as the temperature of a heater of a reflow furnace, the temperature of a blower, the speed of a conveyer, etc., data on physical properties used for the thermal analysis such as specific heat, density, thermal conductivity, infrared absorbency, etc., data on constituents of the reflow furnace such as the dimensions and thermal emissivity of the heater, the position of the conveyer, etc., and the like. It is sufficient that the data necessary for design and thermal analysis are input in advance. The data stored in a memory may be used for carrying out the present method for designing a printed-circuit board, or the data may be input just before the present method for designing a printed-circuit board is carried out.

The thermal analysis may be conducted by simulating the heating of the printed-circuit board in the reflow furnace using a known method. For example, may be applicable a method of detecting the temperature of a material heated in an infrared heating furnace as disclosed by Japanese Patent Application No. HEI 8(1996)-152377 filed on Jun. 13, 1996 by the present applicant, and a thermal analysis method for a material heated in a heating furnace as disclosed by Japanese Patent Application No. HEI 10(1998)-119423 filed on Apr. 28, 1998 by the present applicant.

The peak temperature at heating means the maximum temperature when the printed-circuit board is put and heated in an infrared heating furnace or the like for reflow-soldering.

The lower limit temperature means the lowest temperature at which the solder can sufficiently be melted. For example, in the case of using a tin/lead solder (melting point about 183° C.), the lower limit temperature is desirably set at about 200° C. since a margin is required for sufficient melting of the solder. In the case of using a tin-/zinc solder (melting point: about 200° C.), the lower limit temperature is desirably set at about 220° C., and in the case of using a tin/silver solder (melting point: about 210° C.), the lower limit temperature is desirably set at about 230° C.

The upper limit temperature is a temperature above which the components are expected to be thermally damaged. As regards electronic components, it is ordinarily set at 240° C.

From the results of the thermal analysis, it may be enough to evaluate the presence of at least either an unmelted solder joint or an overheated component. More particularly, are evaluated the presence of an unmelted solder joint whose temperature does not reach the lower limit temperature (e.g., 200° C.), the presence of an overheated component whose temperature exceeds the upper limit temperature (e.g., 240° C.), and also the location of the unmelted solder joint and the overheated component if they exist. If there are no unmelted solder joints whose temperature does not reach the lower limit temperature or overheated components whose temperature exceeds the upper limit temperature, the following change of design is not conducted.

The design of a component having the unmelted solder joint and the overheated component may be so changed that the temperature of the unmelted solder joint and overheated component falls between the lower limit temperature and the upper limit temperature. For example, if there exists an unmelted solder joint whose temperature does not reach the lower limit temperature, the design is changed to alter the position and/or type of a component having the unmelted solder joint. If there exists an overheated component exceeding the upper limit temperature, the design is changed to alter the position and/or type of the overheated component. Such alternation of the position and type of components according to the change of the design includes any alternation provided that the circuit has the same function after the alternation as the function before the alternation. That is, the change of the design includes any types of alternation including the alternation of the position and type of compositions having unmelted solder joints whose temperature does not reach the lower limit temperature or overheated components whose temperature exceeds the upper limit temperature.

As an example of the change of the design of components, a component having an unmelted solder joint may be moved to a position on the printed-circuit board where the temperature is high, with reference to a temperature distribution on the printed-circuit board obtained by the thermal analysis, or alternatively, may be replaced with a component which has the same function but has a smaller heat capacity (can be easily heated), with reference to a table in which components with the same function are listed in order of heat capacity (in decreasing order of heatability or in increasing order of heatability).

Also, an overheated component may be moved to a position on the printed-circuit board where the temperature is low with reference to the temperature distribution on the printed-circuit board obtained by the thermal analysis, or alternatively, may be replaced with a component which has the same function but has a larger heat capacity (cannot be easily heated) with reference to the table in which components with the same function are listed in order of heat capacity.

The change of the design of components may desirably be carried out by giving priority to the components having unmelted solder joints in increasing order of temperature at heating and to the overheated components in decreasing order of temperature at heating.

Outputs of the results of the change of the design include any form of output showing the results of the change of the position and type of the components. For example, data on the change of the design may be output in the form of direct feed-back to a design processing section for the printed-circuit board without being printed or displayed, or alternatively, may be output in such a form that the data are printed or displayed and then the design is changed by an instruction of a user referring to the display or printout. Media for outputting the data include any type of outputting media such as printers, displays, CD-ROMs, floppy disks, transportable memories including IC cards, and memories via lines including the internet and LANs.

The present invention also provides an apparatus for designing a printed-circuit board comprising: an input section for inputting beforehand data necessary for designing and thermally analyzing a printed-circuit board on which a component having a solder joint is mounted; a reflow thermal analyzing section for thermally analyzing the printed-circuit board by simulating the heating of the printed-circuit board in a reflow furnace with use of the input data necessary for the thermal analysis; a design section for evaluating from a result of the thermal analysis whether or not there exists at least either one of an unmelted solder joint whose peak temperature does not reach a predetermined lower limit temperature at heating and an over-heated component whose temperature exceeds a predetermined upper limit temperature at heating, and, according to a result of the above evaluation, changing a design of a component having the unmelted solder joint and/or the over-heated component so that the temperature of the unmelted solder joint and/or the over-heated component is within a range from the lower limit temperature to the upper limit temperature; and an output section for outputting the result of change of the design.

The present invention further provides a recording medium readable by a computer, the recording medium storing a program for causing the computer to perform the steps of controlling the above-described apparatus for designing a printed-circuit board.

The present invention is now described in detail with reference to embodiments illustrated in the figures. However, the present invention is not limited thereto.

FIG. 1 is a block diagram illustrating the construction of an embodiment of the apparatus for designing a printed-circuit board of the present invention.

This apparatus for designing a printed-circuit board is for carrying out the method for designing a printed-circuit board which allows for uniform heating of the printed-circuit board at reflow-soldering. That is, for soldering the components onto the printed-circuit board, the printed-circuit board on which the components are placed is heated in a reflow furnace. The apparatus is for determining the optimal arrangement of the components so that, at heating, the solder joints are heated at or above the melting point of the solder and the components are not overheated.

The present apparatus for designing a printed-circuit board is composed mainly of a design apparatus core 1-1, a memory thereof 1-2, a transmission line analyzer 1-7 for analyzing a transmission line when circuits of the printed-circuits boards operate, a thermal analyzer 1-8 for analyzing heat generated by the components when the printed-circuit board operates, a reflow heat analyzer 1-9, a memory thereof 1-10, an interface device 1-17, an input device 1-18 comprised of a key-board, a mouse or the like, and a display device 1-19 comprised of a CRT display, a liquid crystal display or the like.

The apparatus for designing a printed-circuit board, for example, may be an exclusive processing system which is built in a control system of an infrared heater for reflow heating and is constructed with a microprocessor, or may be a general computer system which is constructed independently of the infrared heater and utilizes a commercially available personal computer or workstation.

For example, in the case where the apparatus for designing a printed-circuit board is constructed of a personal computer, the above-mentioned design apparatus core 1-1, transmission line analyzer 1-7, thermal analyzer 1-8, reflow heat analyzer 1-9 and interface device 1-17 are formed of a computer system including a CPU, a ROM, a RAM, I/O ports and the like.

In this case, the function of each device can be realized by executing the program, which is stored in a computer-readable recording medium (not shown) and is loaded as required on a main memory within the computer system.

The recording medium may be formed of a transportable medium such as a CD-ROM, a floppy disk, an IC card or the like, a memory via a line such as the internet, a LAN or the like, or a processor (e.g., client) side memory such as a ROM, a RAM, a hard disk or the like built-in the computer system.

The reflow thermal analyzer 1-9 may be constructed of the same processor as that of the design apparatus core 1-1 or of another processor. The transmission line analyzer 1-7 and the thermal analyzer 1-8 may be constructed of the same processor as that of the design apparatus core 1-1, but may desirably be systems connected via lines because they are always used for designing printed-circuit boards.

A memory 1-2 of the design apparatus core 1-1 is constructed of a hard disk. The memory 1-2 stores therein, as design data, board configuration data 1-3 about the shape and dimensions of printed boards, component arrangement data 1-4 about the positions of components to be mounted, wiring data 1-5 about wiring patterns on boards, a component library 1-6 which is a data library about the type and shape of components and the like.

A memory 1-10 of the reflow thermal analyzer 1-9 stores therein, as thermal analysis data, board configuration data 1-11 about the shape and dimensions of printed boards, component arrangement data 1-12 about the positions of components to be mounted, heating condition data 1-13 about the heater temperature, blower temperature, conveyer speed and the like of the reflow furnace, a component library 1-14 which is a data library including the type and shape of components, table of components of the same function in order of heat capacity and the like, a physical property library 1-15 which is a data library about physical property values such as specific heat, density, heat conductivity, infrared absorbance and the like used for the thermal analysis, and a reflow furnace library 1-16 which is a data library about the dimensions and emissivity of the heater and the position of the conveyer in the reflow furnace, and the like. The board configuration data 1-11, the component arrangement data 1-12 and the component library 1-14 are data whose items are common to those of the board configuration data 1-3, the component arrangement data 1-4 and the component library 1-6 stored in the memory 1-2 of the design apparatus core 1-1, but are more simplified data of models for the thermal analysis as compared with the design data. The memory 1-10 may be constructed by use of the same hard disk as used for the memory 1-2.

The reflow thermal analyzer 1-9 has a modeling section 1-20, which produces model data for the thermal analysis by combining the printed-circuit board configuration data received from the interface device with the physical property data in the physical property library 1-15 of the reflow thermal analyzer 1-9.

The design apparatus core 1-1 first designs the wiring on the board, the selection and arrangement of components and the like and provisionally determines the arrangement of the components for satisfying electrical and structural specifications required of an objective printed-circuit board with reference to the design data stored in the memory 1-2. The design may be made by a known method.

Next, the reflow thermal analyzer 1-9 is used for thermally analyzing the printed-circuit board when it is reflow-heated under specific heating conditions to work out the temperature distribution and temperature profile of the printed-circuit board. The heating conditions for the reflow furnace may be set as appropriate using a known method. For example, is applicable the heating conditions setting method for a heating furnace disclosed by Japanese Patent Application No. HEI 10 (1998)-119423 filed by the present applicant on Apr. 28, 1998.

As a result of the analysis, if a solder joint does not reach a pre-set lower limit temperature (a temperature above which the solder is sufficiently melted: 200° C. or higher in the case of a tin/lead eutectic solder) or if a component exceeds a pre-set upper temperature (heat resistance temperature of components: generally 240° C.), the design is changed to optimize the arrangement of components and/or the type of components.

More particularly, as regards a component whose solder joint does not reach the lower limit temperature, the component may be moved to a position on the board where the temperature is high with reference to the temperature distribution on the board, or the component may be replaced with a component which has the same function as that of the component but has a smaller heat capacity than that of the component. These operations are carried out automatically.

As regards a component which is predicted by the thermal analysis to exceed the upper limit temperature and be thermally damaged, the position of the component on the printed-circuit board may be adjusted to reduce the distance between the component and a part (a region of the board or a component) on the printed-circuit board which part is near the component and has a low temperature, because the peak temperature of the component can be lowered by reducing the distance, or the component may be replaced with a component which has the same function as that of the component but has a larger heat capacity than that of the component. These operations are carried out automatically.

Is now described in detail the operation in the case where there exists a component whose solder joint does not reach the lower limit temperature or a component whose main body exceeds the upper limit temperature.

Here, the temperature above which the solder melts sufficiently varies depending upon the type of a solder used. In this embodiment, a tin/lead eutectic (melting point: 183° C.) is used for example. Ordinarily, to allow for a margin for sufficient melt of the solder, the heating temperature is set about 10% above the melting point. Accordingly, in this embodiment, 200° C. is set as the lower limit temperature. However, this setting can be changed as appropriate by a user through the input device 1-18 depending upon the material for a solder used.

[Step 1]
(a) Regarding a component having a solder joint not reaching the lower limit temperature, if there are a plurality of such components, priority is given to them in increasing order of temperature, and the following temperature-raising operation 1 or 2 is conducted according to the priority. In this embodiment, the temperature-raising operation 1 is set to be done in preference to the other.

① Temperature-raising Operation 1: Movement of component

Direction of Movement

Figure 2:
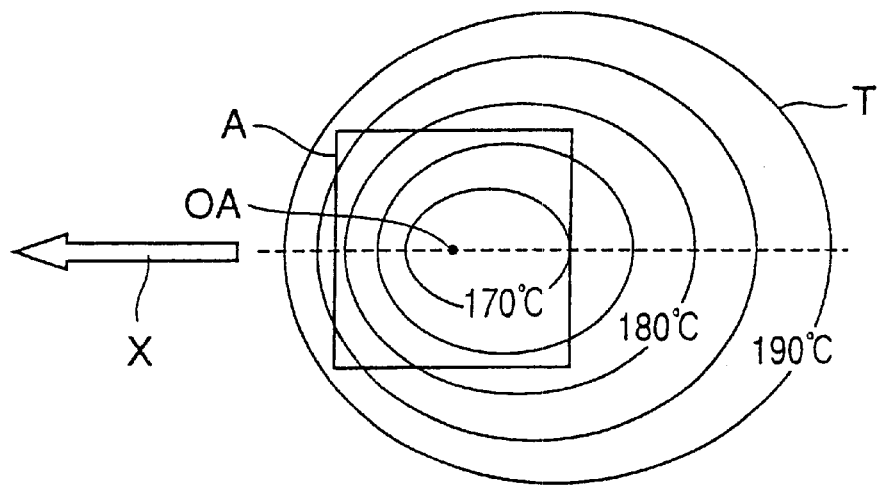
FIG. 2 illustrates the direction of movement of a component in an embodiment.

FIG. 2 illustrates the direction of movement of a component. In the figure, T denotes an isotherm, A a component to be moved, OA the center of the component, and X the direction of movement. As shown in this figure, judging from the temperature around the component A, the component A is moved in a direction such that the temperature at the reflow peak becomes the highest around the position of the component A. In this case, the component A is moved from the center of the component A toward a direction X in which a temperature gradient is the largest.

Distance of Movement

Figure 3:
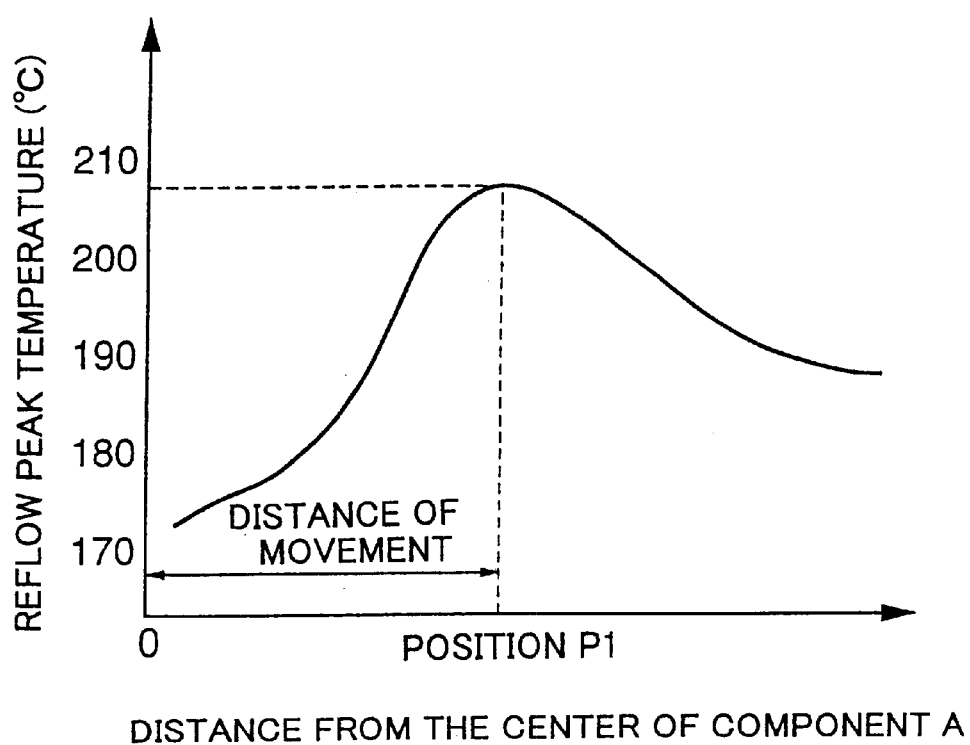
FIG. 3 is a graphical representation showing a relationship between a reflow peak temperature and a distance from the center of a component in a direction X in an embodiment.

FIG. 3 is a graphical representation showing a relationship between a reflow peak temperature and a distance from the center of the component A in the direction X. The component A is moved to a position P1 having the highest temperature in the temperature distribution in the direction X. After movement, the position of the component A is verified according to the component arrangement data 1-4. If the component A after movement interferes with other components or if the component B partially extends outside the board, the component A is relocated at a position which is the nearest to the position P2 and at which the component A does not interfere with other components and is within the board.

Here, the interference between components means that clearance between the components is 2 mm or smaller. In this embodiment, this value is set at 2 mm or smaller from wiring conditions. However, this setting can be changed as appropriate, for example, to 1 mm or smaller or 1.5 mm or smaller, by a user through the input device 1-18 depending upon design conditions.

② Temperature-raising Operation 2: Replacement with a component having the same function but different heat capacity.

FIG. 6 shows the contents of a table in which components having the same function are shown in order of heat capacity (J/° C.·m$^2$) per unit projection area of the components on the board. The component is replaced with reference to this table. In the case of a component whose solder joint does not reach the lower limit temperature, the component is replaced with one having a small heat capacity.

(b) Regarding a component whose main body exceeds the upper limit temperature, if there are a plurality of such components, priority is given to them in decreasing order of temperature, and the following temperature-lowering operation 1 or 2 is conducted according to the priority. In this embodiment, the temperature-raising operation 1 is set to be done in preference to the other.

① Temperature-lowering Operation 1: Movement of component

Direction of Movement

Figure 4:
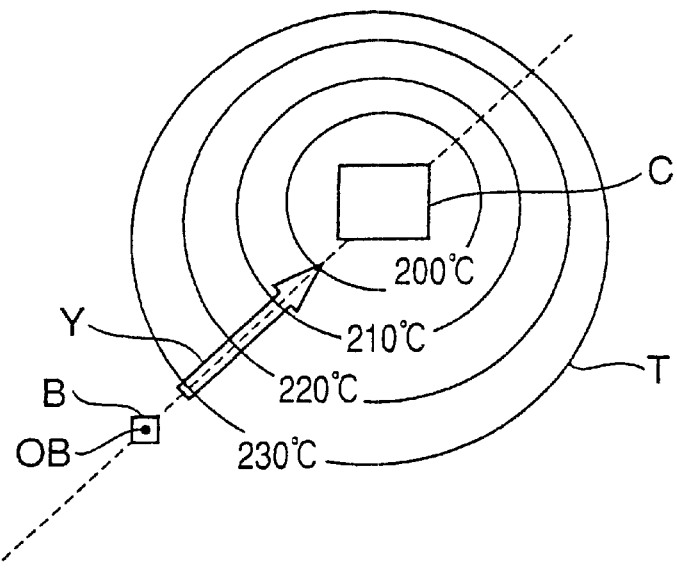
FIG. 4 illustrates the direction of movement of a component in an embodiment.

FIG. 4 illustrates the direction of movement of a component. In the figure, T denotes an isotherm, B a component to be moved, OB the center of the component, Y the direction of movement, and C a component with a low temperature near the component B. As shown in this figure, judging the temperature around the component B, the component B is moved in a direction such that the temperature at the reflow peak becomes the lowest around the position of the component B. In this case, the component B is moved toward a direction Y in such a manner that it approaches the component C near the component B whose temperature is low.

Distance of Movement

Figure 5:
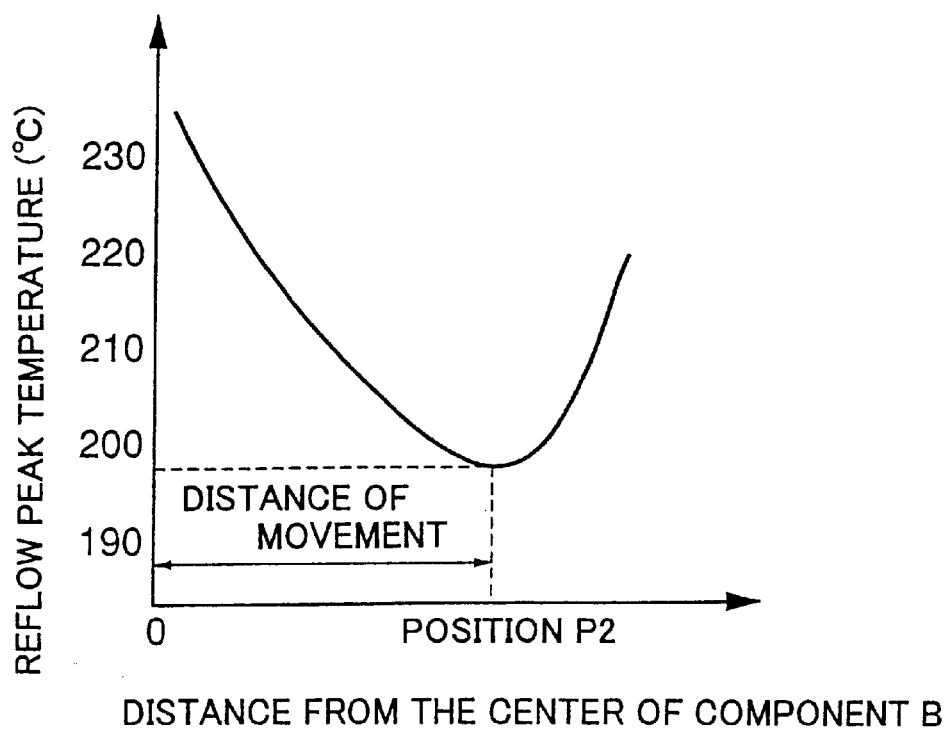
FIG. 5 is a graphical representation showing a relationship between a reflow peak temperature and a distance from the center of a component in a direction Y in an embodiment.

FIG. 5 is a graphical representation showing a relationship between a reflow peak temperature (° C.) and a distance from the center OB of the component B in the direction Y. The component B is moved to a position P2 having the lowest temperature in the temperature distribution in the direction Y. After movement, the position of the component B is verified according to the component arrangement data 1-4. If the component after movement interferes with other components (if the clearance with other components is 2 mm or less), or if the component B partially extends outside the board, the component B is relocated at a position which is the nearest to the position P2 and at which the component B does not interfere with other components and is within the board.

② Temperature-lowering Operation 2: Replacement with a component having the same function but different heat capacity The component B is replaced with reference to the table in the component library 1-14 in which table components having the same function are shown in order of heat capacity. In the case of a component whose main body exceeds the specific temperature, the component is replaced with one having a large heat capacity.

[Step 2]

After the operation is performed in Step 1, is carried out again the thermal analysis of the printed-circuit board in the reflow furnace to obtain the temperature distribution and the temperature profile of the printed-circuit board at the reflow heating. As a result, if the solder joint of the component A does not still reach the specific temperature, the "temperature-raising operation 1" and the "temperature-raising operation 2" of Step 1 are repeated at the same time as a temperature raising operation 3. Also, if the body of the component B still exceeds the specific temperature, the "temperature-lowering operation 1" and the "temperature-lowering operation 2" of Step 1 are repeated at the same time as a temperature lowering operation 3.

Further, as a result of the thermal analysis, if the component A is over-heated, or if the component B is lowered too much, the amount of movement of the component A or B is adjusted to control the change of the temperature of the component A or B. That is, the amount of movement of the components A or B is so determined that the amount becomes an objective amount from the graphical representations shown in FIGS. 3 and 4 with the amount of movement of the components and the change of the temperature of the components plotted in abscissa and in ordinate, respectively.

The above operation is carried out on all components not reaching the lower limit temperature and all components exceeding the upper limit temperature. The positions of the components on the printed-circuit board are set in order of the priority given to the components.

In the above temperature-raising operation 2 and temperature-lowering operation 2, the replacement with the components having the same function and a different heat capacity is done according to the table stored in the component library 1-14 of the memory 1-10 in which table the components having the same function are listed in order of heat capacity ($J/°$ $C.·m^2$) per unit projection area of the components on the board. However, a table may be prepared in which the components are listed in the order described below.

In the above, the heat capacity ($J/°$ $C.·m^2$) per unit projection area of the components on the board is considered as representing the heatability of the components. The heat capacity is generally represented as follows:

$$\text{Heat capacity} = \text{Specific heat} \times \text{Density}$$

Heat capacity: $J/K·m^3$

Specific heat: $J/kg·K$

Density: $kg/m^3$

In this case, since whether the components are easily heated or not is also related to the volume thereof, a table may be prepared in which the components are listed in order of "total heat capacity."

$$\text{Total heat capacity } (J/K) = \text{Heat capacity } (J/K·m^3) \times \text{Volume } (m^3)$$

Alternatively, since the surface area and the infrared absorbance of the components also relates to "whether or not the components are easily heated," a table may be prepared in which the components are listed in order of "heatability coefficient" as follows:

$$\text{Heatability coefficient} = (\text{Emissivity} \times \text{Surface area})/\text{Total heat capacity}$$

In the above temperature-lowering operations 1 and 2, if there exist a plurality of components whose main bodies exceed the upper limit temperature, priority is given in decreasing order of temperature, and the temperature-lowering operation 1 or 2 is carried out in order of the given priority. However, since strictly speaking the heat resistance varies component by component, the upper limit temperature of 240° C. may not be set uniformly for all components. Desirably the heat resistance is stored for every component and priority of the operation is given in order of decreasing excess of the temperature of the main bodies of components over the heat resistance.

More particularly, the upper limit temperature may generally be 240° C. uniformly. However, strictly, every component has its own heat resistance, and the reliability thereof declines when the temperature exceeds the heat resistance. For example, a plastic package of QFP or the like exhibits a high heat resistance, but an electrolytic capacitor or the like has a low heat resistance. Accordingly, the temperature of the respective components is compared with their heat resistances. The priority is given to the components in order of decreasing values of excesses over the heat resistances.

The transmission line analyzer 1-7 analyzes transmission lines with regard to the delay and reflection of electrical signals, cross-talk noise and the like owing to the wiring pattern on the printed-circuit board. The thermal analyzer 1-8 analyzes a cooling property of the printed-circuit board against heat generated by the components when the printed-circuit board operates.

The design apparatus core 1-1 may be linked with these transmission line analyzer 1-7 and thermal analyzer 1-8 to conduct the transmission line analysis and the thermal analysis. Thus, the design apparatus core can perform the transmission line analysis on the delay and reflection of electrical signals, cross-talk noise due to the wiring pattern and the thermal analysis for verifying the cooling property of the printed-circuit board against the heat generated by mounded components in association with the designing of the printed-circuit board.

The reflow thermal analyzer 1-9 is a device for thermally analyzing the printed-circuit board at reflow heating. It numerically analyzes a model of the printed-circuit board for analysis under boundary conditions defined by data on the dimensions of the heater, the distance between the conveyer and the heater and the like stored in the reflow furnace library 1-16 and heating condition data 1-13 on the heater temperature, the speed of the conveyer and the like. Then the reflow thermal analyzer 1-9 calculates the temperature distribution and temperature profile at the reflow heating of the printed-circuit board. The thermal analysis of the printed-circuit board at the reflow heating may be performed as appropriate by a known method. For example, are applicable the method of detecting the temperature of a material heated in an infrared heating furnace disclosed by Japanese Patent Application No. HEI 8(1996)-152377 filed on Jun. 13, 1996 by the present applicant and the thermal analysis method for a material heated in a heating furnace disclosed by Japanese Patent Application No. HEI 10(1998)-119423 filed on Apr. 28, 1998.

This thermal analysis generates a three-dimensional cubic model of a printed-circuit board, divides the three-dimensional cubic model into a lattice form, and calculates a temperature profile (temperature history with time plotted in abscissa and temperature plotted on ordinate) at each lattice point. From the calculated data, can be extracted the peak temperature at each lattice point and further temperature on optional cross sections parallel to the board, for example, on solder joint faces (ordinarily on the surface of the board) and on surfaces or central planes of components. Thereby it is possible to obtain temperature distribution on the solder joint faces and on the surfaces and the central planes of the components. In the case of a double-face-mounted printed-circuit board, it is possible to obtain the temperature distribution on the solder joint faces, the surfaces and the central planes of the components not only on a front face of the board but also on a rear face thereof.

The interface device 1-17 transfers data between the design apparatus core 1-1 and the reflow thermal analyzer 1-9 for sending data on the design by the design apparatus core 1-1 to the reflow thermal analyzer 1-9 and sending data on the thermal analysis by the reflow thermal analyzer 1-9 to the design apparatus core 1-1.

Data may be input to the design apparatus core 1-1 and the reflow thermal analyzer 1-9 through the input device 1-18. The display device 1-19 displays plans designed by the design apparatus core 1-1 and results of analysis by the reflow thermal analyzer 1-9.

Figure 7:
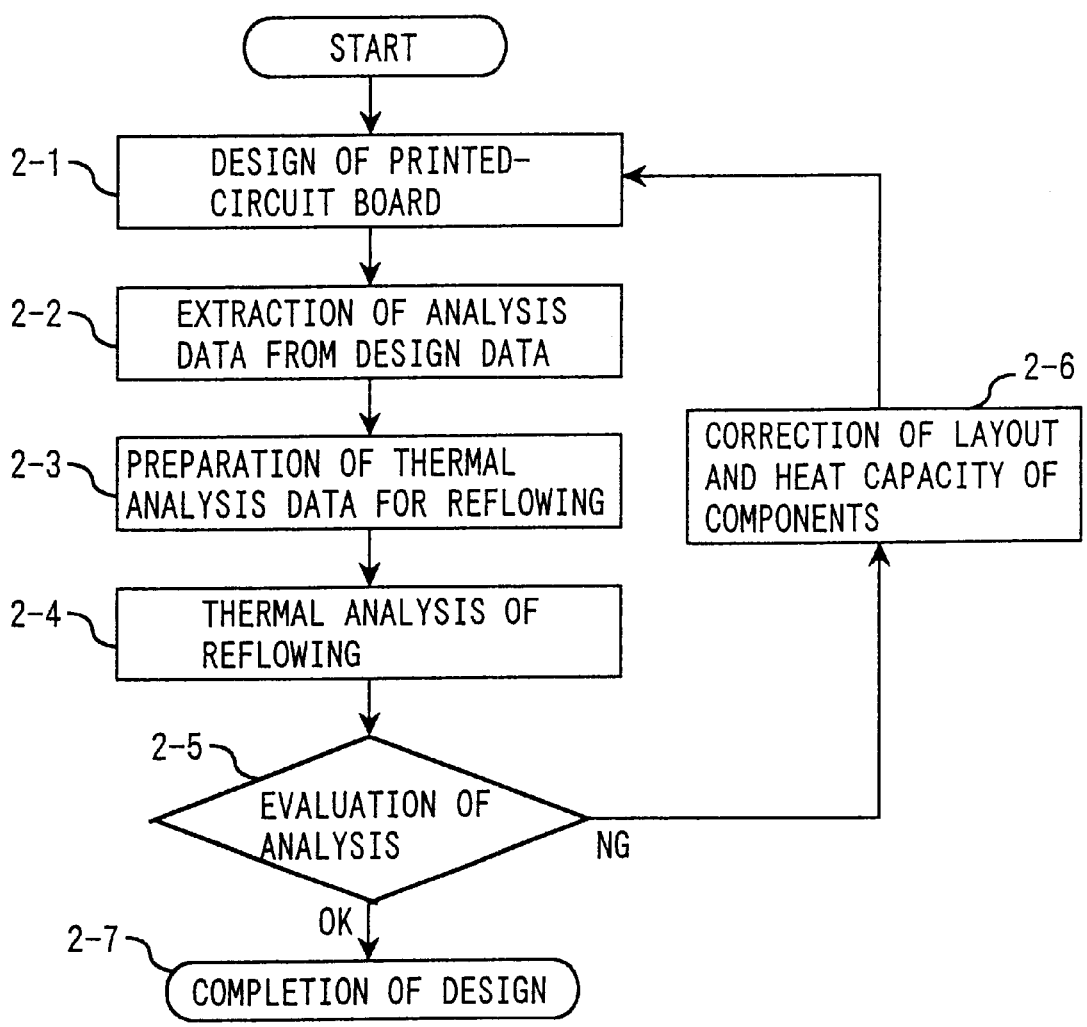
FIG. 7 is a flowchart illustrating the operation of an apparatus for designing a printed-circuit board in accordance with the present invention.

Subsequently, explanation is given of the operation of the apparatus for designing a printed-circuit board of the present invention with reference to the flowchart shown in FIG. 7.

First, in Step 2-1, the design apparatus core 1-1 designs an objective printed-circuit board including the wiring thereof, the selection and the arrangement of components so as to satisfy electrical and structural specification required of the printed-circuit board. In association with the designing, it may also be possible to perform the transmission line analysis about the delay, reflection and cross-talk noises of electric signals caused by wiring patterns and the thermal analysis about the cooling performance of the printed-circuit board against the heat generation by mounted components.

Figure 8:
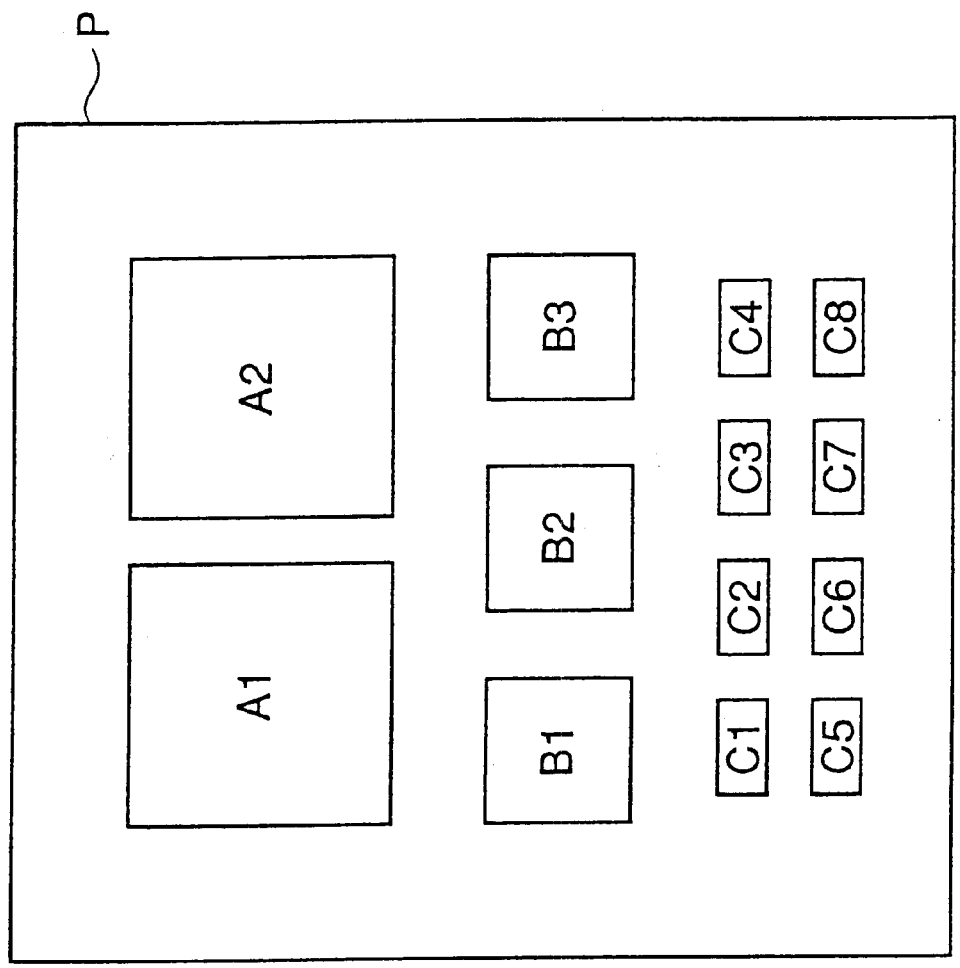
FIG. 8 illustrates an example of a designed printed-circuit board in an embodiment.

FIG. 8 illustrates an example of a designed printed-circuit board. In this printed-circuit board, the size of a board P is 180 mm×200 mm and the thickness t of the board is 1.6 mm. On this printed-circuit board, mounded are a plurality of components A1, A2 and components B1, B2, B3 which are QFPs (quad flat packages) and components C1, C2, C3, C4, C5, C6 which are SOPs (small outline packages).

Next, in Step 2-2, the interface device 1-17 extracts data on the shape and dimensions of the board and the type, position, shape and the like of the components, which data are required for the analysis by the thermal analyzer 1-9, from the design data in the design apparatus core 1-1 and delivers the data to the thermal analyzer 1-9.

Next, in Step 2-3, the modeling section 1-20 in the reflow thermal analyzer 1-9 produces analysis model data for the thermal analysis by combining the data on the shape of the printed-circuit board delivered by the interface device 1-17 with data on physical properties in the physical property library 1-15 of the reflow thermal analyzer 1-9 and stores the analysis model data in the memory 1-10.

Next, in Step 2-4, the reflow thermal analyzer 1-9 numerically analyzes the analysis model of the printed-circuit board under the boundary conditions determined from data in the reflow furnace library 1-16 about the dimensions of the heater, the distance between the conveyer and the heater, etc. and the heating condition data 1-13 about the temperature of the heater, the speed of the conveyer, etc. in order to calculate the temperature distribution and the temperature profile of the printed-circuit board in the reflow furnace.

Next, in Step 2-5, the temperature distribution and the temperature profile of the printed-circuit board are displayed on the display device 1-19 as analysis results.

Figure 9:
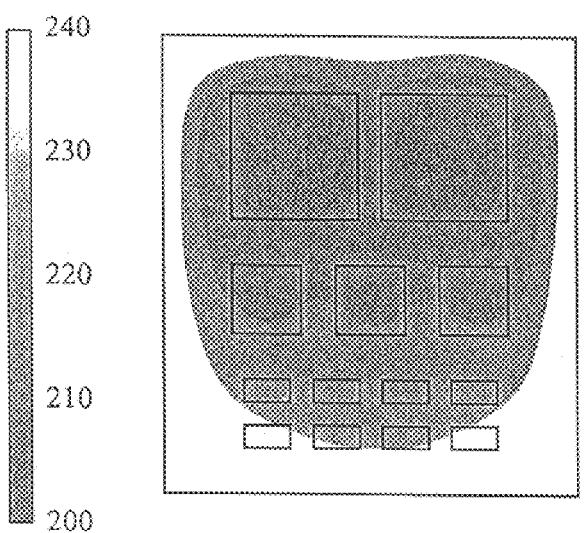
FIG. 9 shows a temperature distribution on a printed-circuit board at a reflow peak, the temperature distribution being displayed on a display device, in an embodiment.
Figure 9:
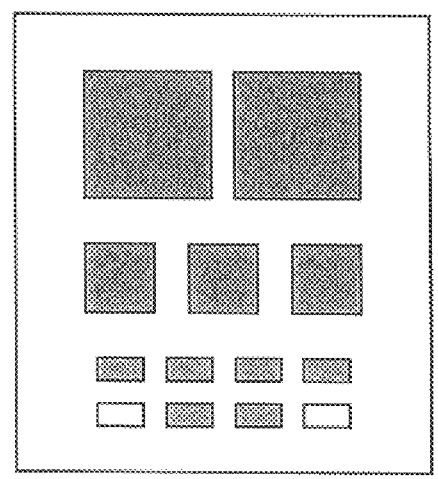

FIG. 9 shows the temperature distribution of the printed-circuit board at the reflow peak displayed on the display, FIG. 9(*a*) and FIG. 9(*b*) showing the temperature distribution on the surface of the board and on central planes of components. From the temperature distribution shown in FIG. 9(*a*), are located joints which do not reach the lower limit temperature T1 (200° C. for tin/lead eutectic alloy). From the temperature distribution shown in FIG. 9(*b*), are located components which are overheated and exceed the upper limit temperature T2 (240° C.).

The temperature distribution of FIG. 9(*a*) shows that the temperature is low (about 200° C.) at the positions of solder joints M1 and M2 and therefore that the solder may remain unmelted at the positions. Also the temperature distribution of FIG. 9(*b*) shows that the temperature of components C5 and C8 is high, 240° C. and therefore these components may be thermally damaged.

FIG. 9 shows the two temperature distributions on the surface of the board and on the central planes of the components. However, in the thermal analysis, the printed-circuit board is formed into a three-dimensional cubic model and the temperature profile is calculated at each lattice point. Thus, in addition to the temperature distributions on the surface of the board and on the central plane of components, it is possible to calculate and display the temperature distribution on any optional cross section of the board and the temperature distribution on any optional cross section of the components. Also, in the case of a double-face-mounted printed-circuit board, it is possible to display not only a cross section on the front face of the board but also any optional cross section on the rear face of the board.

In Step 2-6, from examination of these analysis results, the design apparatus core 1-1 changes the designs of a component exceeding the upper limit temperature T2 and a component whose solder joint does not reach the lower limit temperature T1 to optimize the position and the type of the components.

More particularly, as described above, the component having a solder joint not reaching the lower limit temperature T1 is automatically moved to a position on the board where the temperature is high with reference to the temperature distribution of the printed-circuit board, or is automatically replaced with a component having the same function as that of the above-mentioned component but a smaller heat capacity than that of the above-mentioned component.

For example, in the case of a printed-circuit board having the temperature of FIG. 9(*a*), the solder joints M1 and M2 have low temperatures since components having large heat capacities are densely mounted. Accordingly, judging from the surrounding temperature, components A1 and A2 are moved in a direction where the temperature gradient is the largest, by such an amount that a desired temperature can be obtained. Thereby the distance between the component A1 and the component A2 is increased from 10 mm to 30 mm.

Regarding the component exceeding the upper limit temperature T2, the arrangement of the components on the board is automatically adjusted so that the distance between the component and a position on the board where the temperature is low is decreased, or the component is automatically replaced with a component having the same function as that of the above-mentioned component but a larger heat capacity than that of the above-mentioned component.

For example, in the case of the printed-circuit board having the temperature distribution of FIG. 9(b), components C5 and C8 have high temperatures. The positions of components C1 to C8 are all brought closer to components B1 to B3 which have relatively low temperatures. Further components C1 and C5 are brought closer to components B1, and components C4 and C8 are brought closer to components B3.

After the above-described change of the arrangement and selection of components, the procedure goes back to Step 2-1 to repeat Steps 2-1 to 2-6 including the change of the design of the printed-circuit board such as rewiring, the thermal analysis at heating in the reflow furnace and the examination of the arrangement of components until the thermal problems of overheated components, unmelted solder at joints and the like do not take place any more.

When there is no possibility of the thermal problems of overheated components, unmelted solder at joints and the like, the design apparatus core 1-1 finishes the design of the printed-circuit board (Step 2-7).

Figure 10:
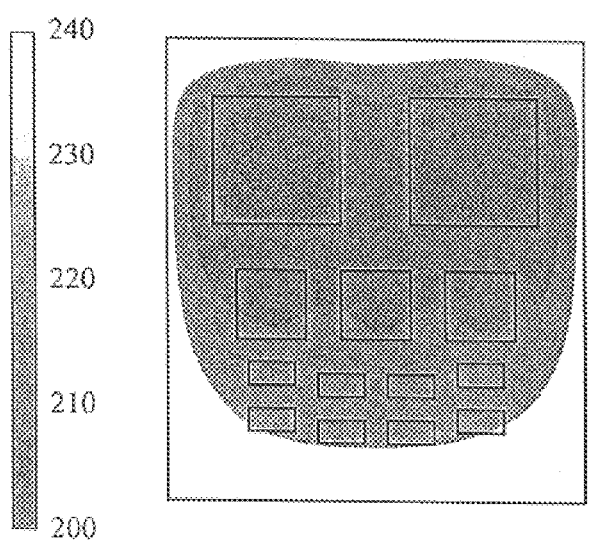
FIG. 10 shows a temperature distribution on a printed-circuit board at a reflow peak when a thermal analysis is carried out again in an embodiment.
Figure 10:
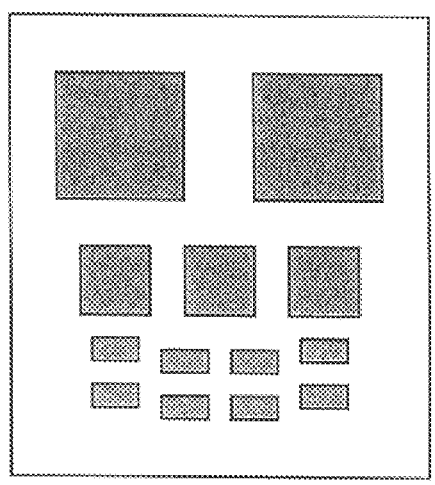

FIG. 10 shows the temperature distribution on the printed-circuit board at the reflow peak when the thermal analysis is carried out again, showing the results of the change of the arrangement of components and the re-conducted thermal analysis of the printed-circuit board in the reflow furnace. FIG. 10(a) and FIG. 10(b) show the temperature distribution on the surface of the board and on the central planes of components, respectively. As shown in these figures, the temperatures of the solder joints M1 and M2 which are low in FIG. 9(a) can be raised about 10° C. from 200° C. to 210° C. at which temperature the solder melts sufficiently. Also, the temperature of the overheated components C5 and C8 in FIG. 9(b) can be lowered about 10° C. from 240° C. to 230° C. which is below the heat resistance of the components.

The printed-circuit board designed by the above-described method is free from the thermal problems such as unmelted solder at joints, overheated components and the like in the production step of reflow soldering since uniform heatability at reflow heating is considered by the thermal analysis. Also stable reflow soldering can be done, and consequently, the printed-circuit board is mechanically highly reliable.

In the embodiment, the tin/lead solder is used for reflow soldering. However, the printed-circuit board may be designed on assumption that tin/zinc solder (melting point: about 200° C.), tin/silver solder (melting point: about 210° C.) or the like is used. In such a case, the tin/zinc solder and the tin/silver solder are heated to about 220° C. and about 230° C., respectively, to allow for a margin for sufficient melting of the solder. Accordingly, in the case where the tin/silver solder is used, since the heat resistance of the components is 240° C., the temperature of the printed circuit board is required to be controlled within a range of 230 to 240° C., which is smaller than in the case where the tin/lead solder is used. Even in such a case, by appropriately changing the positions and types of components with use of the apparatus for designing printed-circuit boards of the present invention, the reflow soldering can be done without problems such as unmelted solder at joints, overheated components and the like.

What is claimed is:

1. A method for designing a printed-circuit board comprising the steps of:
   a. inputting beforehand data necessary for designing and thermally analyzing a printed-circuit board on which a component having a solder joint is mounted;
   b. thermally analyzing the printed-circuit board by simulating the heating of the printed-circuit board in a reflow furnace with use of the input data necessary for the thermal analysis;
   c. evaluating from a result of the thermal analysis whether or not there exists at least either one of an unmelted solder joint whose peak temperature does not reach a predetermined lower limit temperature at heating and an over-heated component whose temperature exceeds a predetermined upper limit temperature at heating;
   d. according to a result of the above evaluation, changing a design of a component having the unmelted solder joint and/or the over-heated component so that the temperature of the unmelted solder joint and/or the over-heated component is within a range from the lower limit temperature to the upper limit temperature; and
   e. outputting the result of change of the design.

2. A method for designing a printed-circuit board as set forth in claim 1, wherein the step of changing the design of the component having the unmelted solder joint comprises moving the component to a position on the printed-circuit board where the temperature is high, with reference to a temperature distribution on the printed-circuit board.

3. A method for designing a printed-circuit board as set forth in claim 1, wherein the step of changing the design of the component having the unmelted solder joint comprises replacing the component with a component which has the same function and is easy to heat with reference to a table in which components having the same function are listed in order of heat capacity.

4. A method for designing a printed-circuit board as set forth in claim 1, wherein the step of changing the design of the over-heated component comprises moving the component to a position on the printed-circuit board where the temperature is low, with reference to a temperature distribution on the printed-circuit board.

5. A method for designing a printed-circuit board as set forth in claim 1, wherein the step of changing the design of the over-heated component comprises replacing the component with a component which has the same function and can be less easily heated with reference to a table in which components having the same function are listed in order of heat capacity.

6. A method for designing a printed-circuit board as set forth in claim 1, wherein the step of changing the designs of the component having the unmelted solder joint and the over-heated component comprises giving priority to components having unmelted solder joints in increasing order of temperature at heating and priority to over-heated components in decreasing order of temperature at heating, and changing the designs of the components in order of the given priority.

7. An apparatus for designing a printed-circuit board comprising:

a. an input section for inputting beforehand data necessary for designing and thermally analyzing a printed-circuit board on which a component having a solder joint is mounted;

b. a reflow thermal analyzing section for thermally analyzing the printed-circuit board by simulating the heating of the printed-circuit board in a reflow furnace with use of the input data necessary for the thermal analysis;

c. a design section for evaluating from a result of the thermal analysis whether or not there exists at least either one of an unmelted solder joint whose peak temperature does not reach a predetermined lower limit temperature at heating and an over-heated component whose temperature exceeds a predetermined upper limit temperature at heating, and, according to a result of the above evaluation, changing a design of a component having the unmelted solder joint and/or the over-heated component so that the temperature of the unmelted solder joint and/or the over-heated component is within a range from the lower limit temperature to the upper limit temperature; and d. an output section for outputting the result of change of the design.

8. A computer-readable recording medium containing thereon a program for designing a printed-circuit board, the program having the functions of:

a. causing a computer operation to input beforehand data necessary for designing and thermally analyzing a printed-circuit board on which a component having a solder joint is mounted;

b. causing a computer operation to thermally analyze the printed-circuit board by simulating the heating of the printed-circuit board in a reflow furnace with use of the input data necessary for the thermal analysis;

c. causing a computer operation to evaluate from a result of the thermal analysis whether or not there exists at least either one of an unmelted solder joint whose peak temperature does not reach a predetermined lower limit temperature at heating and an over-heated component whose temperature exceeds a predetermined upper limit temperature at heating;

d. causing a computer operation to change a design of a component having the unmelted solder joint and/or the over-heated component so that the temperature of the unmelted solder joint and/or the over-heated component is within a range from the lower limit temperature to the upper limit temperature according to a result of the above evaluation; and e. causing a computer operation to output the result of change of the design.

* * * * *